(12) United States Patent
Gaeta (10) Patent No.: US 6,435,604 B2
(45) Date of Patent: Aug. 20, 2002

(54) UNIVERSAL REAR DOOR FRAME FOR A TRAILER

(76) Inventor: Noel Gaeta, 1305 Holly Dr., Lafayette, IN (US) 47909

(*) Notice: Subject to any disclaimer, the term of this patent is extended or adjusted under 35 U.S.C. 154(b) by 0 days.

(21) Appl. No.: 09/803,910

(22) Filed: Mar. 13, 2001

Related U.S. Application Data (60) Provisional application No. 60/189,095, filed on Mar. 14, 2000.

(51) Int. Cl.$^7$ .................................................. B60J 7/00
(52) U.S. Cl. .......................... 296/202; 296/50; 296/51; 296/181
(58) Field of Search ............................... 296/50, 146.8, 296/181, 183, 209, 202, 51; 160/188, 201

(56) References Cited

U.S. PATENT DOCUMENTS

| | | |
|---|---|---|
| 3,140,116 A | 7/1964 | Speas |
| 3,211,493 A | 10/1965 | Mandel |
| 3,292,803 A | 12/1966 | Keller et al. |
| 3,693,693 A * | 9/1972 | Court .................... 160/201 X |
| 3,784,243 A * | 1/1974 | Pastva, Jr. ................ 296/50 X |
| 4,652,042 A | 3/1987 | Bader |
| 4,659,132 A | 4/1987 | Day |
| 4,669,775 A | 6/1987 | Mathers |
| 4,860,813 A * | 8/1989 | Ballyns et al. .............. 160/188 |
| 4,943,110 A | 7/1990 | Pastva |
| 4,952,009 A | 8/1990 | Mountz et al. |
| 5,192,176 A | 3/1993 | Roberts |
| 5,501,503 A | 3/1996 | Thayer |
| 5,704,676 A | 1/1998 | Hill |
| 6,047,761 A * | 4/2000 | Jaehnen et al. ............. 160/201 |

FOREIGN PATENT DOCUMENTS

GB   2152448   8/1985

* cited by examiner

*Primary Examiner*—Dennis H. Pedder
(74) *Attorney, Agent, or Firm*—Richard C. Litman (57) ABSTRACT

A universal door frame for semitrailers, vans, and other large over the road cargo vehicles, provides a single frame configuration for use with either side hinged doors or an overhead door, as desired. The present door frame does not require the fabrication of different door frame configurations for each type of door, as is the case with prior art door frames. The present universal door frame is also formed of a relatively few components, requiring only a single component for each side post and a single component for the header of the frame. This saves considerable labor, and thus cost, over prior art frames in which the corresponding components are formed of a series of stock metal sections. The present universal door frame may also include a motor and spool installed within the header, for powered lifting of an overhead door installed with the present door frame.

14 Claims, 5 Drawing Sheets

UNIVERSAL REAR DOOR FRAME FOR A TRAILER

CROSS-REFERENCE TO RELATED APPLICATION

This application claims the benefit of U.S. Provisional Patent Application Serial No. 60/189,095, filed Mar. 14, 2000.

BACKGROUND OF THE INVENTION

1. Field of the Invention

The present invention relates generally to over the road freight vehicles, and more specifically to a novel construction for the rear door frames of large vans and semitrailers. The present rear door frame construction enables a trailer manufacturer to install a single door frame configuration which may be readily adapted to either swinging doors or to an overhead roller door, without requiring a door frame dedicated to each type of door.

2. Description of the Related Art

The trailer manufacturing industry has generally developed certain conventional and specific configurations for various trailer components. While certain differences exist between different trailers, manufacturers have universally tended to construct trailer frames and other components of a relatively large number of relatively simple angle, channel, and other shapes.

Such construction is relatively economical in terms of the materials required, as it requires only a relatively few different readily available stock cross sectional shapes. However, the components must be welded or otherwise assembled together to form the required shapes, and then the finished lengths (posts, headers, sills, etc.) must in turn be assembled to complete the structure. Thus, any savings in material is likely canceled by the labor intensive welding process required to form two or perhaps more linear welds along the length of the frame component assembly. Moreover, the additional time required to fabricate such subassemblies obviously adds considerably to the time required for the construction of a given trailer. The additional labor required for conventional construction results in greater opportunity for error, and resulting requirement for reworking or discarding the improperly constructed component. In addition, such subassemblies constructed of a series of separate stock shapes tend to be heavier than alternative constructions formed of single prefabricated components, and the welds in those built-up subassemblies result in components that are weaker than components formed of single prefabricated lengths of material.

Another problem with conventional trailer frame construction is the development of different frame configurations for different types of trailer doors, as noted further above. A purchaser of a trailer is to a great extent committed to the specific type of door (side hinged or overhead) with which the trailer was originally equipped, regardless of subsequent need or desire.

While it is possible to modify or retrofit a trailer with a different type of door than that with which it was originally manufactured, the process is quite involved, time consuming, and costly. Generally, the rear frame for side hinged doors does not include any means for the installation of lateral tracks or channels for an overhead door, and the frame header does not provide sufficient depth for the mechanism of the overhead door. The frame for an overhead door generally incorporates the lateral door tracks or channels integrally therewith, with the header being relatively deep for the overhead door mechanism. While most customers might prefer side hinged doors due to the higher and slightly wider openings provided, overhead doors might be preferable in certain circumstances, depending upon the space available where the trailer is frequently docked, and other considerations. In any event, once the decision is made as to the type of door to be installed upon a given trailer, it is very difficult to change that door type to an alternative type.

Accordingly, a need will be seen for a universal rear door frame for semitrailers, large vans, and the like, which frame is essentially identical for all trailers and door types. While the present frame may be initially configured for use with side hinged doors, it is a relatively simple matter to fit additional door tracks to the existing door frame to allow the frame to support an overhead door instead. Moreover, the installation of the tracks to the forward surfaces of the side posts and the elimination of the relatively deep header, result in an overhead door having an opening essentially equal to that of the side hinged door, thereby permitting taller and wider loads to be placed in the trailer equipped with the present rear door frame and overhead door. The ease of construction, economy, and versatility of the present universal door frame result in significant advances over other door frames and door installations of the related art.

A discussion of the related art of which the present inventor is aware, and its differences and distinctions from the present invention, is provided below.

U.S. Pat. No. 3,140,116 issued on Jul. 7, 1964 to William D. Speas, titled "Side-Loading Vehicle," describes a trailer in which the side panels and roof are supported upon telescoping vertical posts. The posts may be extended to raise the side panels partially, with the side panels then rolling upwardly to overlap immediately beneath the roof, in order to complete the raising of the sides. Speas does not disclose any specific structure for the conventional appearing rear door frame of his trailer, with its apparently conventional side hinged doors.

U.S. Pat. No. 3,211,493 issued on Oct. 12, 1965 to Richard M. Mandel, titled "Bulkhead Structure," describes various structures providing reinforcement for side hinged and overhead rear doors in trailers and the like. Mandel provides a series of horizontal reinforcements for side doors and vertical reinforcements for overhead doors, in order to reduce damage to such doors due to shifting cargo. Mandel does not disclose any specific structure for the rear door frame of his trailer.

U.S. Pat. No. 3,292,803 issued on Dec. 20, 1966 to Lyle D. Keller et al., titled "Semi-Trailer," describes a trailer having side hinged front doors and a system for lowering the front of the trailer for loading and unloading the trailer where no dock or ramp is available. Keller et al. provide a pneumatic interlock for the doors in order to assure that the trailer brakes remain locked while the doors are unlocked or open. However, Keller et al. do not specify any particular configuration for the frame of the doors for their trailer, nor do they disclose the adoption of an overhead type door with their trailer.

U.S. Pat. No. 4,652,042 issued on Mar. 24, 1987 to Samuel M. Bader, titled "Design Column And Door System For Highway Trailers," describes a trailer having a series of telescoping door panels disposed between a series of actuating columns. Each column includes a multiple section telescoping cylinder, to which the edges of adjacent doors are attached. Actuating the cylinders lifts the lower edges of the doors, causing the sections to telescope into one another. This system is not truly an overhead door, in that no tracks extend into the roof for the door, nor is there any provision for side hinged doors in the Bader trailer. Accordingly, Bader does not disclose any specific structure for the universal use of either side hinged or overhead doors, as provided by the present invention.

U.S. Pat. No. 4,659,132 issued on Apr. 21, 1987 to Gerald G. Day, titled "Convertible Beverage Body For Delivery Truck Or Trailer," describes a trailer having a series of overhead doors installed along the sides and rear of the trailer. The interior of the trailer includes a series of movable panels, providing for side loading of the trailer from ground level or rear loading of the trailer from a raised dock or the like. The Day trailer includes a pair of hinged rear panels which swing inwardly, rather than outwardly as in conventional side hinged doors. The inwardly swinging panels, as well as the other partitions and internal structure, result in considerably less interior volume than available in a trailer utilizing the present rear door frame and side hinged or overhead door therewith. In any event, Day does not disclose any specific structure for either the side or rear door frames or posts in his trailer.

U.S. Pat. No. 4,669,775 issued on Jun. 2, 1987 to Robert S. Mathers, titled "Roller Curtain For Truck Bodies," describes a moistureproof curtain or sheet which is extended from an overhead roller just inside the conventional side hinged doors of a truck trailer or van. The Mathers curtain precludes the entrance of moisture into the lower pressure generated within the trailer or van body when the vehicle is in motion. The device does not extend into the roof, as does an overhead door, but rather rolls up on a roller installed just inside the rear door header of the trailer or van. Mathers does not disclose any specifics regarding the construction of the rear door frame of the trailer or van.

U.S. Pat. No. 4,943,110 issued on Jul. 24, 1990 to John V. Pastva, titled "Curtainside Truck Trailer Access System And Lock Assembly," describes various improvements in latching mechanisms for side curtain type trailers, wherein a flexible curtain or curtains extend along the side of the trailer to allow access through essentially the entire side of the trailer. The rear doors of the trailer disclosed are of the conventional side hinged type. Pastva makes no disclosure of any specific configuration of rear door frame for his trailer.

U.S. Pat. No. 4,952,009 issued on Aug. 28, 1990 to Elton E. Mountz et al., titled "Curtained Doors For Vehicle Bodies," describes various improvements in attachment and tensioning means for such side curtains, providing horizontal and vertical tightening and security for such curtains. No disclosure is made of any form of side hinged or overhead door system, or door frame for such doors.

U.S. Pat. No. 5,192,176 issued on Mar. 9, 1993 to Hardy G. Roberts, titled "Sectional Van Trailer Having Detachable, Interchangeable Compartments Capable Of Forming A Continuous Van Body With Accompanying System For Forming Shelf Decks And Partition Walls Within Cargo Holding Sections," describes a series of modular compartments for removable installation on a trailer frame or the like. The compartments may be joined with intervening walls folded away to form a single, longer compartment if so desired. However, Roberts does not disclose any form of universal door frame for his compartments to provide for either side hinged or overhead doors.

U.S. Pat. No. 5,501,503 issued on Mar. 26, 1996 to Henry Thayer, titled "Vehicular Door," describes an overhead door in which the tracks and rollers are installed to the outside of the trailer. While this responds to the problem of a conventional overhead door and tracks taking up interior volume within the trailer, it creates the further problem of contamination and jamming of the track due to ice, snow, fallen leaves, and other debris. The present invention avoids this problem by installing the overhead door tracks (where used) within the trailer interior, but provides a universal door frame for installation of either side hinged doors or an overhead door, as desired.

U.S. Pat. No. 5,704,676 issued on Jan. 6, 1998 to John A. Hill, titled "Multi-Temperature Cargo Transportation Apparatus," describes a trailer having a series of movable partitions therein. The partitions may be placed as desired to divide the trailer interior into two or more compartments of variable size as desired, with the system further providing for selective heating or cooling of one or more of the compartments. The Hill trailer utilizes a series of three side hinged doors which open into three separate compartments. The side hinged doors are placed forwardly of a single overhead door, with the side hinged doors and overhead door each having a different door frame structure. The Hill trailer teaches away from the present invention, in that (1) it requires two separate door frames for the door structure, and (2) it precludes placement of relatively large cargo within the trailer due to the series of separate side hinged doors and partitions.

Finally, British Patent Publication No. 2,152,448 published on Aug. 7, 1985 to Fruehauf Corporation (USA), titled "Gull-Wing Door Trailer," describes a trailer construction in which each side comprises a single openable panel formed by the side wall and one half of the roof. A hinge line extends down the center of the roof, with each side wall and roof half being selectively lifted by a series of hydraulic jacks or rams. The '448 British Patent Publication makes no disclosure of any specific form of rear door frame, particularly one accommodating either side hinged doors or an overhead door, as provided by the present invention.

None of the above inventions and patents, either singly or in combination, is seen to describe the instant invention as claimed.

SUMMARY OF THE INVENTION

The present invention comprises a universal rear door frame for semitrailers, vans, and other similar cargo vehicles. Heretofore, conventional procedure has been to construct different door frames for either side hinged doors or overhead doors, depending upon the wishes of the customer. This leads to additional time required for construction, due to the different fixtures required for each door, additional stock inventory, etc. Moreover, such conventional door frames are constructed of a series of stock metal shapes (angles, channels, etc.) in order to save money in comparison to the cost of more complex fabricated shapes. However, this leads to additional costs for the labor required to fabricate frames from such a relatively large number of components.

The present invention responds to the above problem by providing a single door frame configuration adapted for use with either side hinged or overhead doors. Hinges may be provided along the rearward surfaces of the frame posts, while overhead door tracks may be provided along the forward surfaces of the posts in the event that an overhead door installation is desired. The basic frame structure remains the same in either case. In addition, the construction of the present frame is much more straightforward than truck trailer door frames of the prior art, which are formed of a series of stock shapes. The present frame utilizes a single square or rectangular section component for each side post and a second single channel component for the header, thus obviating any requirement for seam welding plural components together along their lengths to form the desired post or header component.

Accordingly, it is a principal object of the invention to provide an improved universal door frame for trailers, vans, and the like, comprising a single frame configuration adaptable for use with either side hinged or overhead doors as desired.

It is another object of the invention to provide an improved universal door frame having post and header components each formed of a single piece of metal stock, thereby precluding need for additional seam welding along the lengths of the components.

It is a further object of the invention to provide an improved universal door frame having a relatively wide horizontal width between posts and a relatively tall height between sill and header, for maximizing the size of objects placed within the trailer.

An additional object of the invention is to provide an improved door frame including means for motorizing an overhead door provided therewith.

Still another object of the invention is to provide an improved door frame with a motorized overhead door in which the motor and lifting means are disposed within the header of the door frame.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a universal rear door frame for installation in semitrailers, large vans, and similar cargo carrying vehicles and the like. The present door frame extends for essentially the full width of the trailer body, and is adaptable for the installation of either a pair of opposed side hinged doors or of a single overhead door therewith, thereby precluding any requirement at the manufacturing site for different metal stock components and different alignment fixtures for the fabrication of different door frames for each type of door, according to the needs of the customer.

Figure 1:
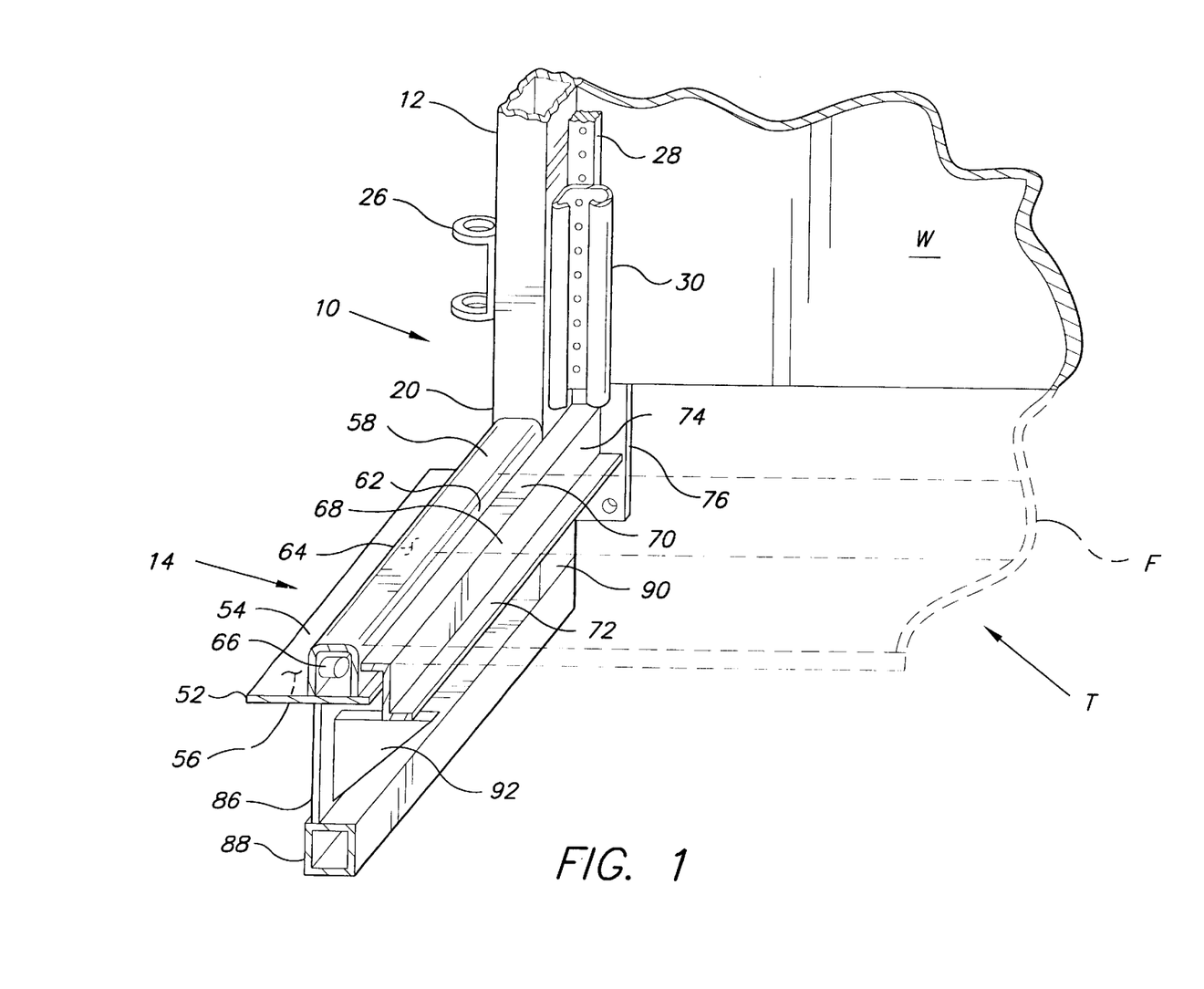
FIG. 1 is a broken away perspective view of the interior of the lower left rear corner of a trailer incorporating the present universal door frame, showing various details thereof.
Figure 6:
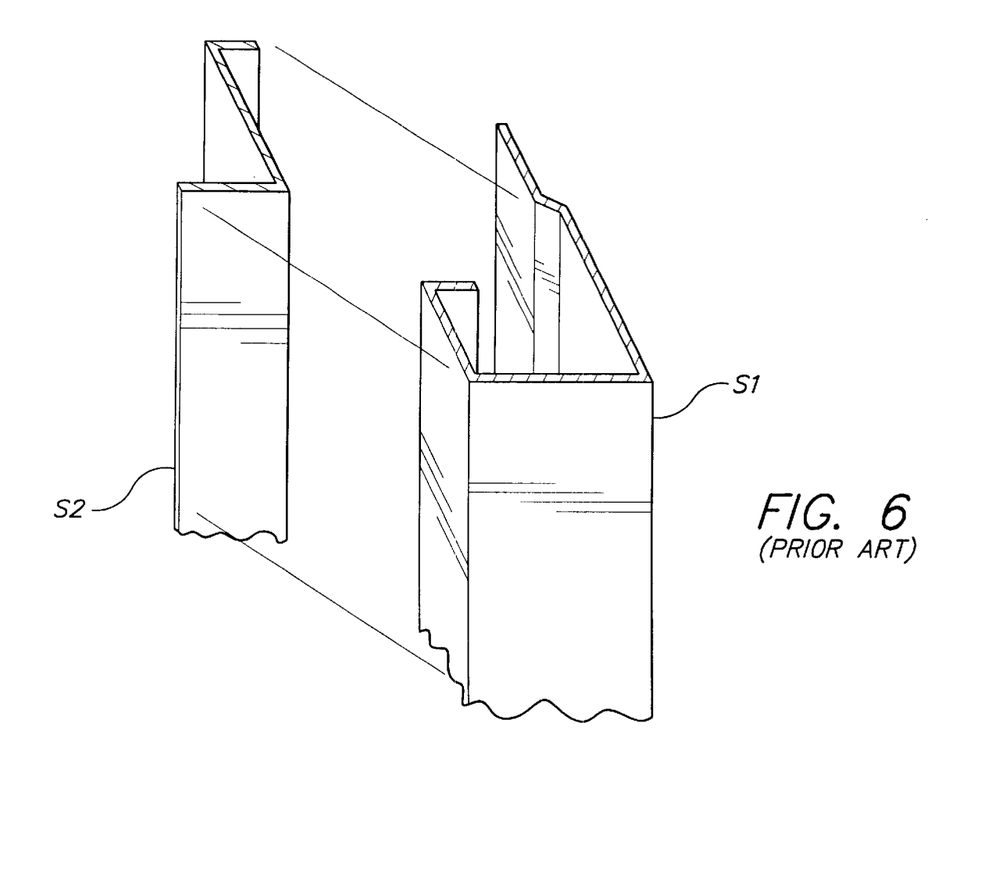
FIG. 6 is a prior art exploded perspective view of the components used for the assembly of a conventional multipiece side post for a trailer door frame.

FIG. 1 provides a detailed broken away perspective view of the interior of the lower left rear corner of an exemplary trailer T equipped with the present universal door frame 10, showing the side post construction (e. g., the left side post 12) and sill or "fantail" assembly 14 of the frame 10. The two opposite side posts 12 and 16 (shown in FIG. 3) are each formed of a single unitary length of relatively narrow preformed square or rectangular stock material, rather than the conventional construction shown in FIG. 6 utilizing a stock channel section S1 which is welded along two seams with another length of stock material S2 having opposed longitudinal bends therein. While the material of the present side posts 12 and 16 may be slightly more costly than the stock components S1 and S2 shown in FIG. 6, the elimination of the requirement for welding two elongate seams along the entire length of the S1 and S2 stock assembly, more than compensates for any additional material costs for the closed rectangular tube of the side posts 12 and 16 of the present universal door frame 10.

Figure 3:
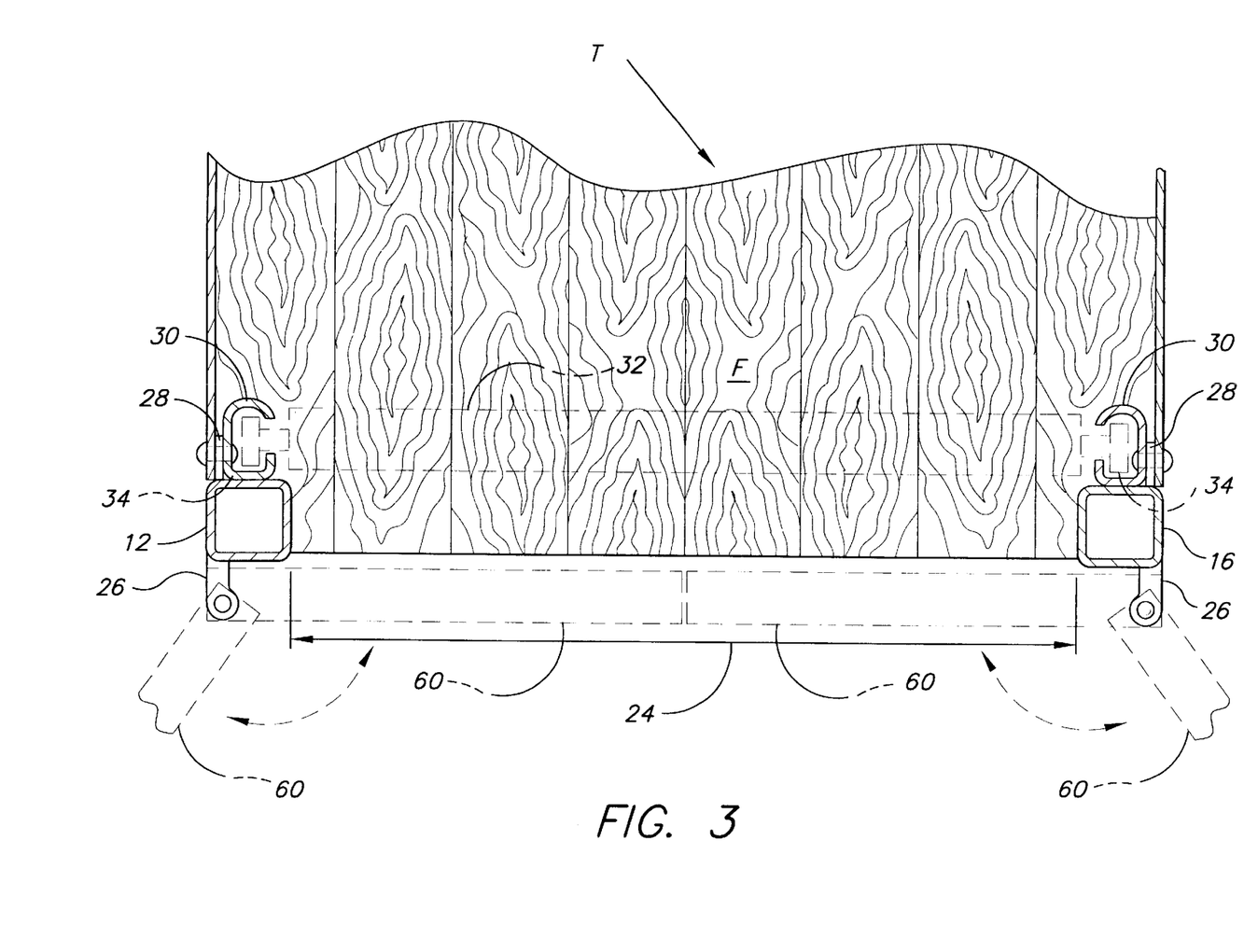
FIG. 3 is a top plan view in section of the rear door area of a trailer incorporating the present universal rear door frame, showing the installation of side hinged doors and an overhead door therewith.
Figure 4:
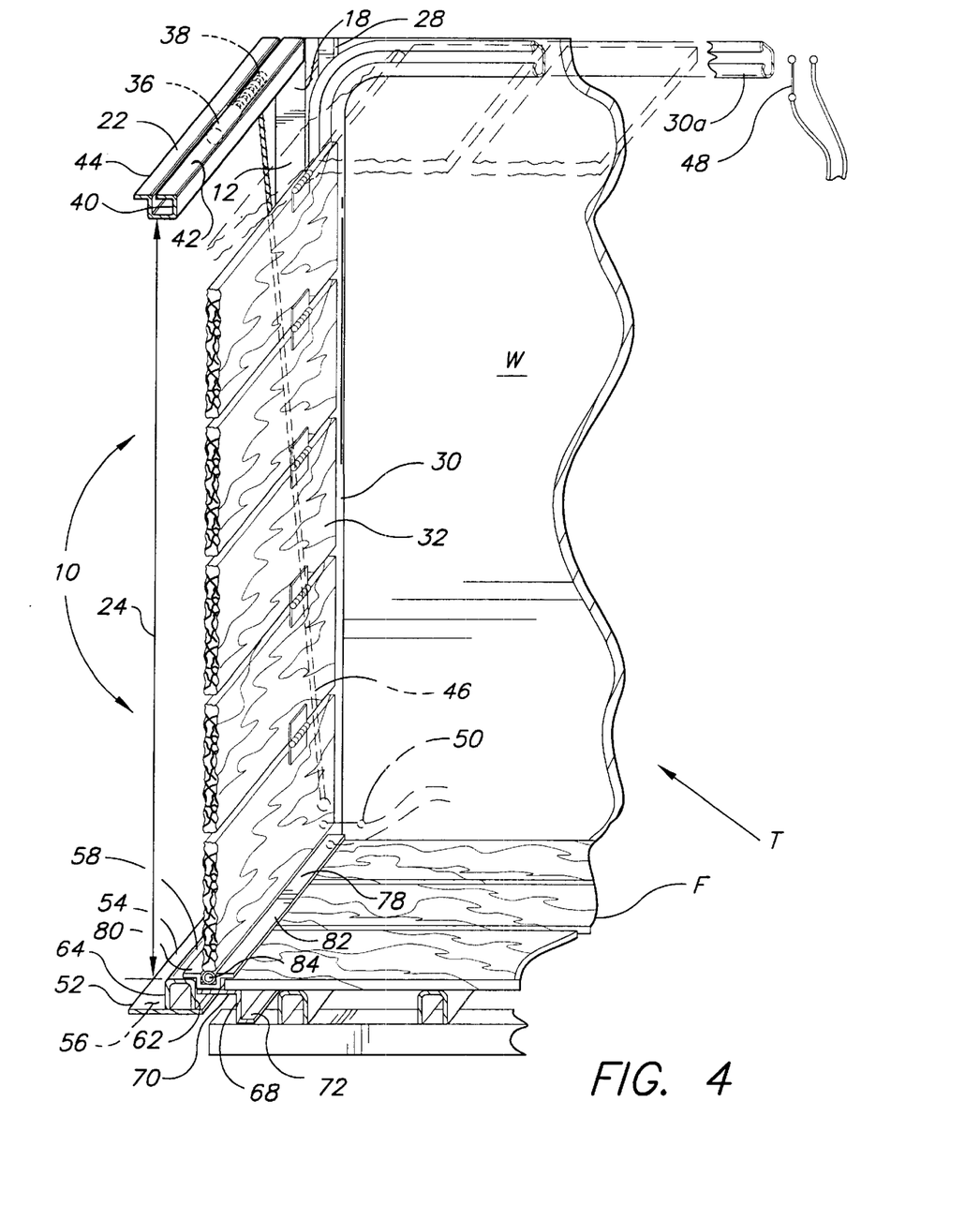
FIG. 4 is a broken away perspective view of the interior of the left rear portion of a trailer incorporating the present universal door frame, showing the installation of a motorized lift for an overhead door therewith.

Each side post 12 and 16 includes an upper end 18 (FIGS. 2 and 4) and an opposite lower end 20 (FIG. 1), with the sill assembly 14 being permanently welded between the lower ends 20, and a narrow header 22 formed of a single preformed length of unitary channel stock being permanently welded between the upper ends 18 of the two side posts 12 and 16. The resulting side post, header, and sill assembly form a solid, continuous universal door frame 10, which defines a relatively wide and high door opening 24 therethrough, as indicated in FIGS. 3 and 4 of the drawings.

Each side post 12 and 16 provides for the installation of hinge butts 26 (hinge mounting brackets) thereto, by welding two or more of the hinge butts 26 to the rearwardly disposed surface of each side post member 12 and 16, as is conventional in the art. However, the two side posts 12 and 16 further include means for installing an overhead door therebetween, if so desired, without any need to modify the basic structure of the door frame 10. Each side post 12 and 16 includes a side wall attachment strip 28 extending from the forward surface thereof, and welded thereto. These side wall attachment strips 28 are provided for the attachment (rivets, etc.) of the side wall panels W of the trailer body to the rear door frame assembly 10.

The attachment strips 28 also provide for the indirect attachment of door tracks or channels 30 to the two side posts 12 and 16, in the event that an overhead door installation is desired. The overhead door tracks 30 are easily installed at the time of construction of the rear door frame 10 and attachment of the trailer side walls W, by riveting them in place simultaneously with the attachment of the side walls W to the attachment strips 28. Alternatively, they may be installed as a retrofit, by drilling out a series of the side wall attachment rivets and riveting the overhead door tracks 30 in place with the reattachment of the side walls W to the attachment strips 28.

The present overhead door track 30 attachment configuration provides a significant advantage over such overhead door installations of the prior art, in that the tracks 30 are disposed in front of the two side posts 12 and 16, rather than to their mutually facing inner surfaces. The provision of side posts 12 and 16 each having a lateral width of only two inches, results in a door opening 24 having a width of 98 inches, when the trailer T is constructed to the maximum width allowed by law. Conventional overhead door construction, with its wider or thicker multiple piece door posts which often have the overhead door tracks installed along the mutually inwardly facing surfaces of the posts, generally restrict the lateral opening width to no more than 93 inches. Thus, the present construction provides more than five percent greater lateral door opening width for an overhead door, which can mean the difference between getting a wide load aboard an enclosed trailer, or being required to ship the load on a relatively unprotected open trailer.

FIGS. 3 and 4 illustrate the installation of an overhead door 32 within the overhead door tracks or channels 30, with FIG. 3 clearly showing the span of the door 32 (shown in broken lines) extending across the complete width of the door opening 24. The overhead door 32 is held within the tracks 30 by conventional rollers 34 extending from each side of the door 32 and riding within the mutually inwardly facing channels of the tracks 30, as shown in FIG. 3.

The present trailer rear door frame construction also provides means for motorizing the operation of an overhead door installed therein, if so desired. Conventionally, the considerable weight of such overhead doors is counterbalanced by a set of springs, not unlike the system commonly used to assist in raising manually operated overhead or swing-up garage doors. These springs are quite bulky and massive, and they and their linkages to the door and their anchor points require considerable space and decrease the payload of the trailer to some extent. The present invention provides a solution to this problem by motorizing the operation of the overhead door 32, when the present trailer door frame 10 is so equipped.

Figure 2:
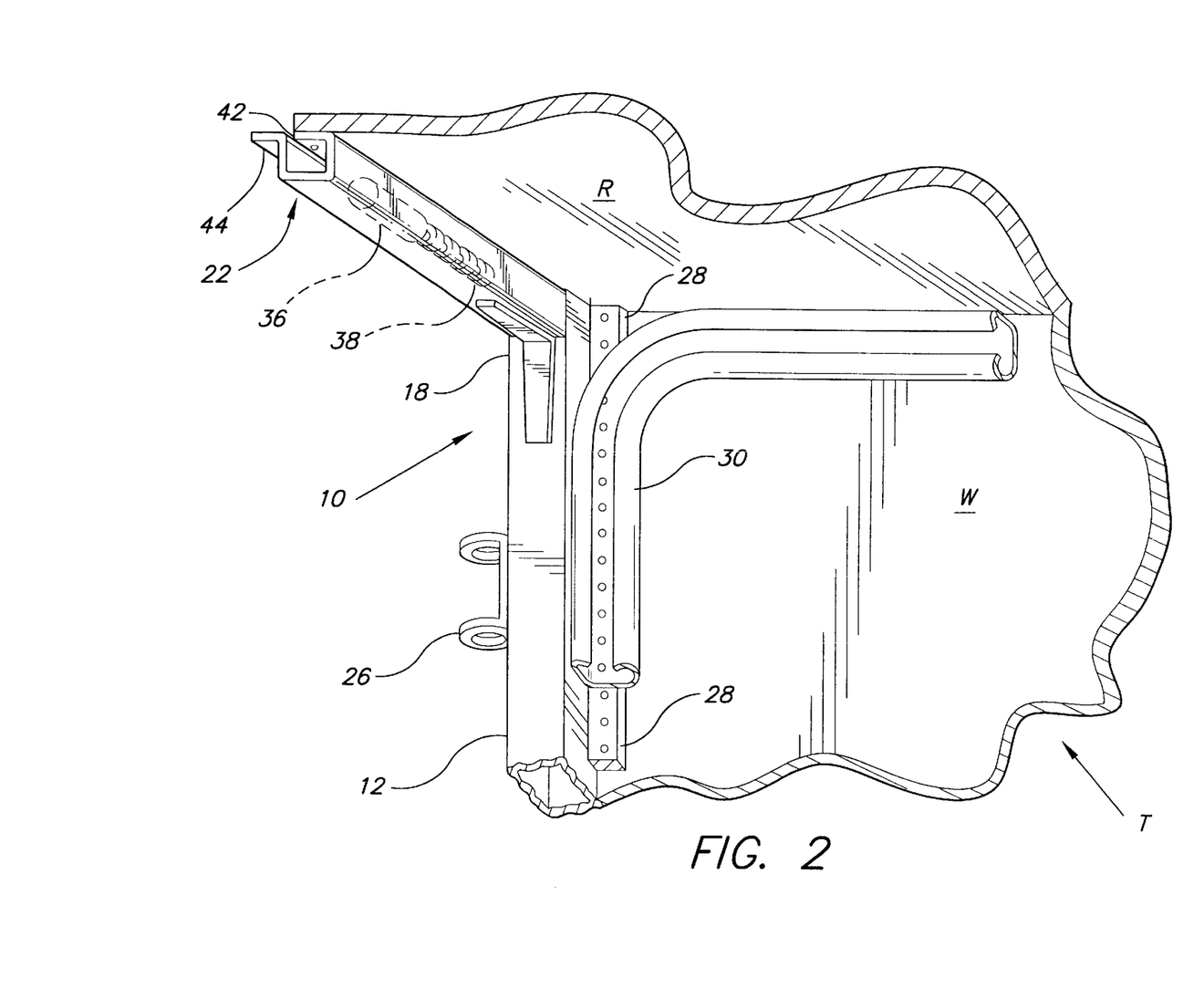
FIG. 2 is a broken away perspective view of the interior of the upper left rear corner of a trailer incorporating the present universal door frame, showing further details thereof.
Figure 5:
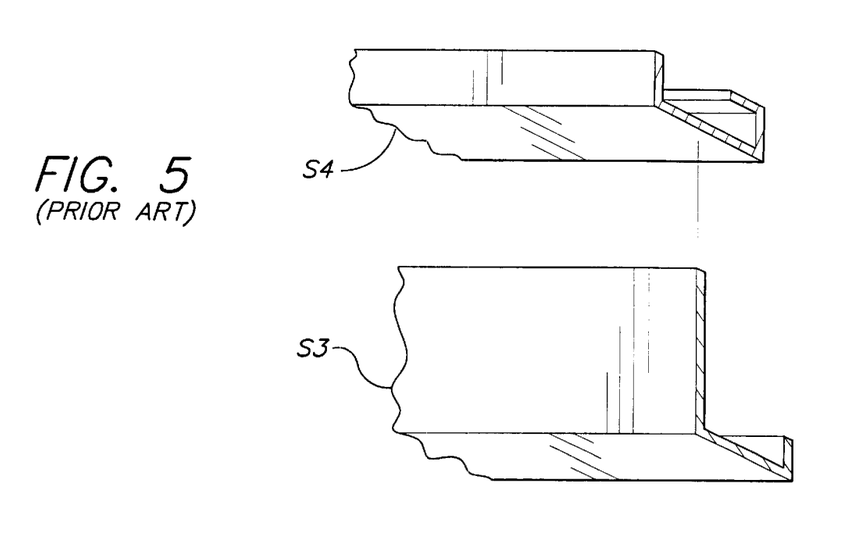
FIG. 5 is a prior art exploded perspective view of the components used for the assembly of a conventional multipiece header for a trailer door frame.

FIGS. 2 and 4 of the drawings illustrate the installation of an overhead door actuation motor 36 and cable winding spool 38 in the header 22 of the door frame assembly 10. The header 22 comprises a generally U-shaped channel 40 having forward and rearward upper flanges, respectively 42 and 44, extending rearwardly from the upper edges of the channel 40. The header 22 is formed of a single, elongate, unitary length of metal, bent up from a single flat plate or sheet and requiring no additional labor for welding multiple components together. Thus, the header 22 of the present invention provides a significant advantage over earlier headers of the related art which have been constructed of two separate structural members S3 and S4, as shown in the prior art header assembly of FIG. 5 of the drawings.

The forward flange 42 serves as a header attachment strip to which the roof R of the trailer may be riveted or otherwise attached to the door frame structure 10. The channel 40 of the header 22 serves as a housing for the overhead door lift motor (or motors) 36 and a spool 38 for winding an overhead door lift cable (or cables) 46 thereon, with the cable 46 being illustrated in FIG. 4 of the drawings. A single motor with spools extending from each end thereof may be provided in the center of the header channel 40, or alternatively a separate motor and spool may be provided at each end of the header channel 40. Another alternative would be to install the motor or motors and appropriate cable linkage at the leading edge of the overhead door 32, along the inside of the roof R of the trailer T, with the cables running within the overhead door tracks 30 or within a separate track or guide, to raise the overhead door 32.

Upper and lower limit switches, respectively 48 and 50, may be installed respectively at the forward end of the overhead door travel at the end of the horizontal run 30a of one of the door tracks and at the door sill area to shut off the motor(s) 36 at each limit of the door travel. Such switches 48 and 50 are shown schematically in FIG. 4 of the drawings. The electrical circuitry for these switches 48 and 50, motor(s) 36, i. e., a double throw master control switch (not shown), and any required relays, etc., are conventional, and are not illustrated in the drawing Figures.

The structure of the sill or "fantail" assembly 14 is illustrated in detail in FIGS. 1 and 4 of the drawings. As opposed to the single piece construction of the two side posts 12 and 14 and the header channel 16 described above, the sill 14 is relatively complex and must be formed of a series of separate elongate metal components. A generally horizontal base plate 52 comprises the "heart" of the sill structure, having an upper surface 54 and an opposite lower surface 56 to which all other sill components are attached.

A fan channel 58, comprising an inverted, generally U-shaped channel, is welded to the upper surface 54 of the base plate 52, and serves as a lower sill against which the side hinged doors 60 (shown in broken lines in FIG. 3) rest when in a closed position, when such side hinged doors are installed on the present universal rear door frame 10. The fan channel 58 includes a forward and an opposite rearward face, respectively 62 and 64, with the rearward face 64 optionally including a series of holes or passages therein for the installation of lighting means 66 (tail lights, brake lights, turn signals, etc.) therein, if such lighting is not installed in a separate panel depending from the sill structure 14.

A floor Z assembly is welded to the forward face 62 of the fan channel 58 to extend forwardly therefrom, and serves as a support for the trailing edge of the trailer floor F, as shown in FIGS. 1 and 4. The floor Z assembly is in turn welded up from a series of stock metal components and welded to the front face 62 of the fan channel 58 as a completed assembly during door frame fabrication.

The floor Z member 68 has an upper rear flange 70, a lower front flange 72, and opposite left and right ends 74; the right end is not shown in the drawings, but it will be understood that the present door frame assembly 10, and all of its left and right components (with the possible exception of the overhead door motor assembly), are laterally symmetrical. An end cap 76 is welded to each end 74 of the floor Z member 68, as shown in FIG. 2, with the edge of the upper rear flange 70 of the resulting floor Z assembly then being welded to the front face 62 of the fan channel member 58 to extend forwardly therefrom. The upper rear flange 70 of the floor Z member 68 serves as a support for the trailing edge of the floor F of the trailer T.

A gap is preferably provided between the trailing edge of the floor F and the forward face 62 of the fan channel 58, with an overhead door edge channel 78 installed within this gap, as shown in FIG. 4 of the drawings. The channel 78 has a rearward flange 80 secured (welded, etc.) to the upper surface of the fan channel 58, with a forward flange 82 extending over the trailing edge of the trailer floor F. The floor F trailing edge is thus captured between the upper rear flange 70 of the floor Z 68 and the overlying front flange 82 of the overhead door edge channel 78. The result is an essentially level sill and floor structure to facilitate the loading and unloading of freight within and from the trailer T, with the channel 78 providing a seat for the door edge seal 84 of the overhead door 32.

The rear sill or fantail assembly 14 also provides for the attachment of a bumper assembly thereto, as illustrated in FIG. 1 of the drawings. The bumper assembly comprises a pair of bumper legs 86 (flat plate, square or rectangular tube, etc.) which depend from the bottom surface 56 of the base plate 52 of the sill or fantail assembly 14. A generally horizontal bumper tube 88 is secured (welded, etc.) to the lower ends of the bumper legs 86, and extends laterally across the rear of the trailer T below the sill or fantail assembly 14, as is conventional in the art. A pair of laterally disposed bumper end members 90, one of which is shown in FIG. 1, depend from each end of the door frame assembly 10 and secure to the ends of the bumper tube 88. Finally, a series of forwardly disposed bumper braces 92 extend from the bumper legs 86 to attach (via welds, etc.) to the conventional rear wheel slider adjustment members. The complete assembly of the bumper braces 92 and slider members M of the trailer T cannot be shown in any single drawing Figure, due to the need to show other components clearly in each Figure.

The present bumper tube 88 is novel in that it is formed of a single, unitary, prefabricated metal tube, rather than being formed of a pair of L-shaped components which are welded along two seams common to their mating edges, as is conventional in the art. The present bumper tube 88 thus eliminates the labor required to weld these two seams to fabricate a conventional bumper tube at the manufacturing plant, and accordingly saves the cost involved in such labor to provide a more economical construction.

In conclusion, the present universal door frame for a trailer, van, or the like provides significant labor savings in construction over conventional door frames of the prior art, as well as greatly reducing or eliminating the labor and materials required to convert a trailer having one type of door to another type of door. The construction of the present rear door frame of prefabricated tubular and channel components, rather than welding up the required frame members from a series of angles, channels, and other stock cross sectional shapes, results in a significant savings of labor during trailer construction, which more than offsets any additional costs for the preformed channels, tubes, and other materials used in the present rear door frame.

In addition to the above advantages, the use of narrower side post members and shallow header channel, provide a significantly wider and taller door opening than is conventional in the art. As noted further above, this can mean the difference between placing a load within an enclosed trailer equipped with the present universal door frame., and being required to carry the load on an open trailer, where the load is exposed to the elements, theft, etc. The wide fan channel used in the present universal door frame provides additional advantages, in that it allows trailer rear lighting to be installed within the channel, thereby eliminating need for exposed light brackets depending from the fantail assembly. The relatively wide fan channel enables latch means for an overhead door to be integrated therewith, rather than being attached to the rear of the channel where it is subject to damage.

The installation of the overhead door tracks or channels to the front side of the side posts of the present door frame, also provide further advantages in that the overhead door may be constructed to have a somewhat wider width than conventional overhead doors riding in door tracks affixed inwardly relative to the side posts. Thus, the present universal door frame provides the same opening width for either a side hinged door or an overhead door installed therewith. Another advantage of the overhead door track configuration is the positioning of the overhead door slightly forwardly of the door frame, thus providing greater protection for the overhead door during backing and docking maneuvers than is conventionally provided for such overhead doors in conventional trailer door frame construction. Accordingly, the advantages provided by the present universal door frame construction will be greatly appreciated by trailer manufacturers and those who use such trailers in commerce as well.

It is to be understood that the present invention is not limited to the embodiments described above, but encompasses any and all embodiments within the scope of the following claims.

I claim:

1. A universal door frame for a trailer, comprising:
   a left side post;
   a right side post disposed opposite said left side post;
   each said side post further having an upper end and a lower end opposite said upper end;
   a header extending between said upper end of each said side post;
   a sill assembly extending between said lower end of each said side post;
   each said side post being formed of a single, unitary length of preformed steel having a rectangular cross section;
   said header being formed of a single, unitary length of preformed steel;
   each said side post, said header, and said sill assembly defining a rectangular door opening therebetween;
   each said side post, said header, and said sill assembly being permanently welded together to form a solid, continuous door frame assembly; and
   each said side post further having a plurality of spaced apart hinge butts for installing a side hinged door to each said side post thereto and having a side wall attachment strip welded to and extending forwardly from each said side post for installing a track for an overhead door thereto.

2. The universal door frame according to claim 1, wherein said sill assembly comprises:
   a base plate having an upper surface and a lower surface opposite said upper surface;
   a fan channel having an inverted, generally U-shaped cross section and a forward face, welded to said upper surface of said base plate;
   a floor Z member having a left end and a right end opposite said left end;
   an end cap welded to each said end of said floor Z member, with each said end cap and said floor Z member forming a floor Z assembly; and
   said floor Z assembly being welded to said forward face of said fan channel and extending forwardly therefrom.

3. The universal door frame according to claim 2, further including:
   lighting means disposed within said fan channel, and;
   a bumper assembly depending from said lower surface of said base plate.

4. The universal door frame according to claim 1 further including an inwardly facing overhead door track secured to each said side wall attachment strip, forwardly of each respective said side post.

5. The universal door frame according to claim 1, wherein said header comprises a generally U-shaped channel having a forward and a rearward, rearwardly extending upper flange, the universal door frame further comprising a motor and spool means disposed within said channel for selectively raising and lowering an overhead door.

6. The universal door frame according to claim 5, further including switch means for limiting maximum upward and downward travel of said overhead door.

7. A universal door frame and door for a trailer, comprising:
- a left side post;
- a right side post disposed opposite said left side post;
- a side wall attachment strip welded to and extending forwardly from each said side post;
- an inwardly facing overhead door track secured to each said side wall attachment strip, forwardly of each respective said side post;
- each said side post further having an upper end and a lower end opposite said upper end;
- a header extending between said upper end of each said side post;
- a sill assembly extending between said lower end of each said side post;
- each said side post being formed of a single, unitary length of preformed steel having a rectangular cross section;
- said header being formed of a single, unitary length of preformed steel;
- each said side post, said header, and said sill assembly defining a rectangular door opening therebetween;
- each said side post, said header, and said sill assembly being permanently welded together to form a solid, continuous door frame assembly;
- an overhead door installed between each said overhead door track; and
- a plurality of spaced apart hinge butts welded to each said side post for alternately installing a side hinged door to each said side post.

8. The universal door frame according to claim 7, wherein said sill assembly comprises:
- a base plate having an upper surface and a lower surface opposite said upper surface;
- a fan channel having an inverted, generally U-shaped cross section and a forward face, welded to said upper surface of said base plate;
- a floor Z member having a left end and a right end opposite said left end;
- an end cap welded to each said end of said floor Z member, with each said end cap and said floor Z member forming a floor Z assembly; and
- said floor Z assembly being welded to said forward face of said fan channel and extending forwardly therefrom.

9. The universal door frame according to claim 8, further including:
- lighting means disposed within said fan channel, and;
- a bumper assembly depending from said lower surface of said base plate.

10. The universal door frame according to claim 7, wherein said header comprises a generally U-shaped channel having a forward and a rearward, rearwardly extending upper flange, the universal door frame further comprising a motor and spool means disposed within said channel for selectively raising and lowering said overhead door.

11. The universal door frame according to claim 10, further including switch means for limiting maximum upward and downward travel of said overhead door.

12. A universal door frame and door for a trailer, comprising:
- a left side post;
- a right side post disposed opposite said left side post;
- a side wall attachment strip welded to and extending forwardly from each said side post;
- an inwardly facing overhead door track secured to each said side wall attachment strip, forwardly of each respective said side post;
- each said side post further having an upper end and a lower end opposite said upper end;
- a header extending between said upper end of each said side post;
- a sill assembly extending between said lower end of each said side post;
- each said side post being formed of a single, unitary length of preformed steel having a rectangular cross section;
- said header being formed of a single, unitary length of preformed steel;
- each said side post, said header, and said sill assembly defining a rectangular door opening therebetween;
- each said side post, said header, and said sill assembly being permanently welded together to form a solid, continuous door frame assembly; and
- a side hinged door attached to each of said side posts.

13. The universal door frame according to claim 12, wherein said sill assembly comprises:
- a base plate having an upper surface and a lower surface opposite said upper surface;
- a fan channel having an inverted, generally U-shaped cross section and a forward face, welded to said upper surface of said base plate;
- a floor Z member having a left end and a right end opposite said left end;
- an end cap welded to each said end of said floor Z member, with each said end cap and said floor Z member forming a floor Z assembly; and
- said floor Z assembly being welded to said forward face of said fan channel and extending forwardly therefrom.

14. The universal door frame according to claim 13, further including:
- lighting means disposed within said fan channel, and;
- a bumper assembly depending from said lower surface of said base plate.

* * * * *